(12) United States Patent
Boyd et al.

(10) Patent No.: US 10,949,356 B2
(45) Date of Patent: Mar. 16, 2021

(54) FAST PAGE FAULT HANDLING PROCESS IMPLEMENTED ON PERSISTENT MEMORY

(71) Applicant: Intel Corporation, Santa Clara, CA (US)

(72) Inventors: James A. Boyd, Hillsboro, OR (US); Robert J. Royer, Jr., Portland, OR (US); Lily P. Looi, Portland, OR (US); Gary C. Chow, Santa Clara, CA (US); Zvika Greenfield, Kfar Sava (IL); Chia-Hung S. Kuo, Folsom, CA (US); Dale J. Juenemann, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/442,267

(22) Filed: Jun. 14, 2019

(65) Prior Publication Data

US 2019/0303300 A1    Oct. 3, 2019

(51) Int. Cl.
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/1021* (2013.01)

(58) Field of Classification Search
CPC .. G06F 12/1009; G06F 12/1027; G06F 12/08; G06F 12/0811; G06F 12/0804; G06F 2212/1021; G06F 2212/20; G06F 2212/2005; G06F 2212/304; G06F 2212/684
See application file for complete search history.

(56) References Cited

U.S. PATENT DOCUMENTS

| | | | |
|---|---|---|---|
| 2013/0080693 A1* | 3/2013 | Kim | G06F 12/0246 711/105 |
| 2017/0192686 A1* | 7/2017 | Niu | G06F 12/0246 |
| 2018/0081816 A1* | 3/2018 | Coburn | G06F 12/1027 |
| 2018/0089096 A1 | 3/2018 | Greenspan et al. | |
| 2018/0095884 A1 | 4/2018 | Kaminski et al. | |
| 2018/0336142 A1* | 11/2018 | Pellegrini | G06F 12/1027 |
| 2019/0004940 A1 | 1/2019 | Boyd et al. | |
| 2019/0042414 A1 | 2/2019 | Juenemann et al. | |
| 2019/0042415 A1 | 2/2019 | Boyd et al. | |
| 2019/0050346 A1 | 2/2019 | Greenfield et al. | |
| 2019/0310796 A1* | 10/2019 | Perez | G06F 3/0604 |
| 2020/0026657 A1* | 1/2020 | Franke | G06F 12/1483 |

* cited by examiner

*Primary Examiner* — Tracy A Warren
(74) *Attorney, Agent, or Firm* — Compass IP Law PC

(57) ABSTRACT

A method is described. The method includes receiving notice of a page fault. A page targeted by a memory access instruction that resulted in the page fault residing in persistent memory without system memory status. In response to the page fault, updating page table information to include a translation that points to the page in persistent memory such that the page changes to system memory status without moving the page and system memory expands to include the page in persistent memory.

20 Claims, 5 Drawing Sheets

FAST PAGE FAULT HANDLING PROCESS IMPLEMENTED ON PERSISTENT MEMORY

FIELD OF INVENTION

The field of invention pertains generally to the computing sciences, and, more specifically, to a fast page fault handling process implemented on persistent memory.

BACKGROUND

Computing system designers are continuously seeking ways to improve the performance of their systems. With the onset of "big data", "cloud computing" and other data center centric computing paradigms, the importance of accessing increasing sizes of data with increasing performance is driving additional layers in the memory and/or storage hierarchies.

FIGURES

A better understanding of the present invention can be obtained from the following detailed description in conjunction with the following drawings, in which.

1.0 TRADITIONAL PAGE FAULT HANDLING

Figure 1:
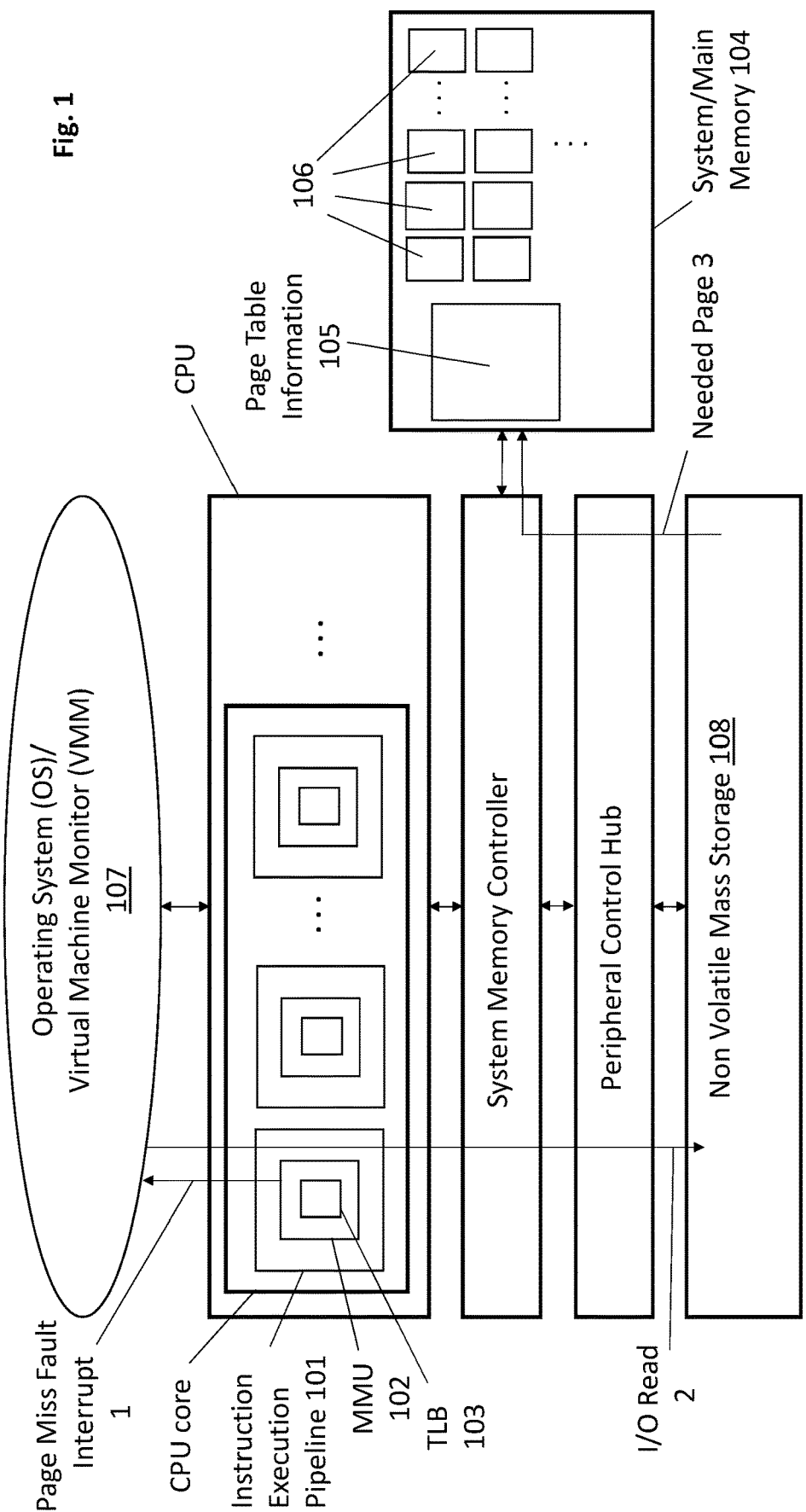
FIG. 1 shows a traditional page fault handling process.

As is known in the art, software programs are generally written and compiled to refer to virtual addresses. Referring to FIG. 1, a CPU instruction execution pipeline 101 typically includes a memory management unit (MMU) 102 that includes a translation look-aside buffer 103 (TLB). The TLB 103 is essentially a table that records which virtual addresses map to which actual, physical addresses in system memory 104 (also referred to as "main memory"). Here, software program code is typically written to refer to system memory as if it keeps little/no other software. As such, for example, many software programs are written to initially refer to a base memory address of 0000 and then incrementally add addresses as needed. More than one software program written in such a manner could not operate out of a same memory (their "virtual" addresses would collide).

Therefore a TLB 103 is used to translate each virtual address specified by a particular software program/thread into a physical memory address where the information referred to by the virtual address actually resides in system memory 104. According to many CPU designs, the TLB 103 is technically a cache that keeps the most recently invoked virtual to physical address translations. In fact, the system as a whole keeps many more virtual to physical address translations than what the TLB 103 is capable of holding.

Many computer systems, therefore, keep the complete set of active virtual to physical address translations 105 for the entire system, referred to as "page tables", in main memory 104. If a software program executes a memory access instruction whose virtual memory address suffers a miss in the TLB 103, the MMU 102 accesses the page table information 105 in main memory 104 to fetch the missing translation and enter it in the TLB 103. With the needed translation having been received by the MMU 102, the virtual address is translated to its correct physical address and the memory access instruction is carried out to completion.

In a traditional computer system, the program code and/or data of a software program is kept in main memory 104 on one or more "pages" of information 106. Here, each different virtual to physical address translation that is maintained in a TLB 103 or in the page tables 105 corresponds to a different page of information in main memory (the physical address of each corresponds to the base physical address of a particular "page" in system memory that a range of physical system memory addresses falls within (e.g., only higher ordered bits of a physical system memory addresses are identified in a translation entry)).

Operating system software (including real time operating system software (RTOS)) and/or virtual machine monitor (VMM) software 107 is responsible for maintaining the page table information 105 thereby assigning the program code and data of specific software programs to specific physical addresses in system memory 104. The page table information 105 lists the active translations for the pages that are presently in system memory 104.

Unfortunately, the size of main memory 104 is less than the total amount of program code and data that the computer is configured to execute/process. As such, non volatile mass storage 108 is used as the final "backing store" that contains the complete set of program code and data that the computer is configured to execute.

When a software program is newly opened to be executed by one or more CPU cores, one or more of the software program's pages are called up from non-volatile mass storage 108 (e.g., a disk-drive) by the system software and written into system memory 104. The CPU core(s) then issue memory read requests for program code and memory read and write requests for data that are on the pages in order to physically execute the software program out of system memory 104.

Often a needed page is not in main memory 104 and therefore must be called up from mass storage 108 and entered in main memory 104. In this case a page table miss or "page fault" occurs. That is, a virtual memory address was presented to the TLB 103 which missed and then the MMU's follow-up attempt to fetch the translation from the page table information 105 also missed (because the corresponding page is not in main memory). The miss in the page table information 105 prompts the page to be called up from mass storage 108 (accesses to non volatile storage 108 are typically performed at a granularity of no less than a page such that one or more pages are called up from mass storage as a consequence of the page fault).

As such, the processing of a page fault not only includes the transfer of the page's information from mass storage 108 to main memory 104 but also includes updating the page table information 105 with a new translation that correlates the page's virtual address to its physical address in main memory 104. In many systems the TLB 103 is updated to include the new translation as well. If main memory 104 is full when the page miss occurred, an older page in main memory must be written back to mass storage (e.g., if it is dirty) to make room for the new page being called up. The translation for the new page takes the place of the translation for the evicted page in the page table information 105 (the page table information 105 is updated to reflect the existence of the new page in memory).

Here, the initial page fault generates an interrupt 1 that invokes operating system and/or virtual machine monitor (OS/VMM) software. The OS/VMM keeps the system configuration information that identifies where each instance of software and its working data space has been installed in mass storage 108 and therefore can translate the virtual address to a mass storage address (or "logical block address" (LBA)). The OS/VMM then issues an "I/O" read operation 2 to mass storage 108 to fetch the information 3 from mass storage 108 at the appropriate LBA. Here, a single page may be read or multiple pages may be read (e.g., as a larger block) depending on system configuration.

A problem, however, is the time consumed servicing the I/O read request 2. Here, the I/O read request 2 needs to pass through the system hardware from a CPU core to a peripheral control hub. The peripheral control hub then issues the read request to the appropriate mass storage device (e.g., disk drive, solid state drive). Not only is the I/O read request 2 and returned read data 3 delayed navigating through system traffic, but also, mass storage devices have large access latencies. Thus, page faults 1 and the time consumed 2, 3 bringing a needed page up to main memory 104 from mass storage 108 in response is a significant burden to overall system performance.

2.0 MULTI-TIERED MEMORY

Figure 2:
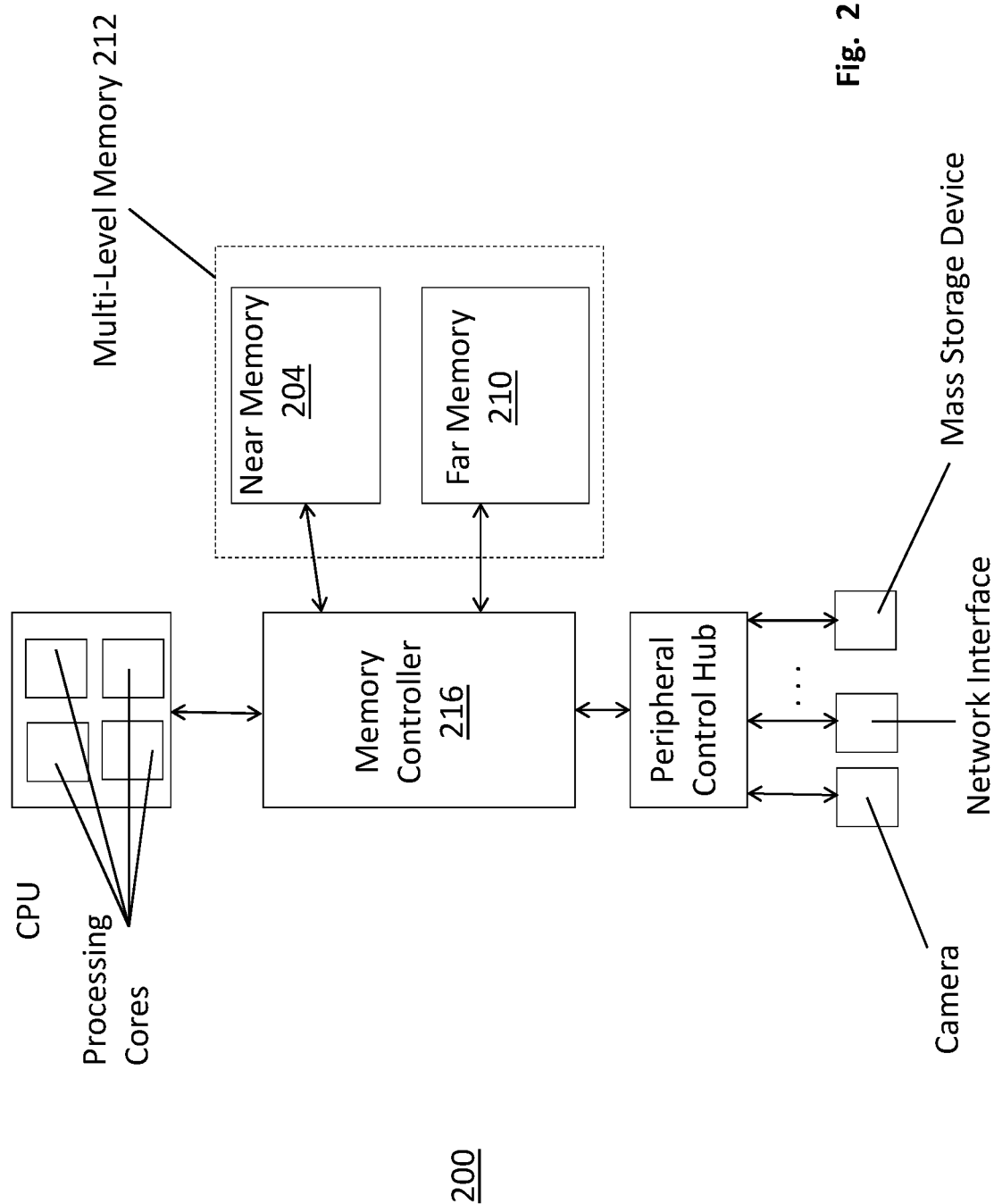
FIG. 2 shows a computing system with a multi-level system memory.

FIG. 2 shows an embodiment of a computing system 200 having a multi-tiered or multi-level memory structure 212. According to various embodiments, a faster near memory level 204 (e.g., having higher bandwidth and/or small access time(s), etc.) may be utilized as primary system memory, while, a slower far memory level 310 (e.g., having lower bandwidth and/or large access time(s), etc.) may be utilized as slower system memory and/or faster mass storage.

In various embodiments, if far memory 310 is used as a system memory level, near memory 304 is used to store the more frequently accessed items of program code and/or data that are kept in system memory. By storing the more frequently used items in near memory 304, the system memory will be observed as faster because the system will often read/write from/to items that are being stored in faster near memory 304.

According to various embodiments, as mentioned above, near memory 304 has lower access times than the far memory 310. For example, near memory 304 may exhibit reduced access times by having a faster read and/or write clock speed than the far memory 310. Here, the near memory 304 may be a faster (e.g., lower access time), volatile system memory technology (e.g., high performance dynamic random access memory (DRAM) and/or SRAM memory cells) co-located with a system memory controller 316.

By contrast, far memory 310 may be implemented with, e.g., a non volatile memory technology that is slower (e.g., longer access time) than volatile/DRAM memory (or whatever technology is used for near memory). For example, far memory 310 may be implemented with a new emerging non volatile random access memory (NVRAM) technology (also referred to as "persistent memory") having read and/or write latencies that are comparable with that of DRAM. Such emerging NVRAM memories are therefore generally faster than both disk drives and flash memory. Many of these emerging NVRAM memories are composed of resistive storage cells that are formed in three-dimensional storage arrays above a semiconductor chip substrate (e.g., amongst the chip's interconnect wiring levels).

For example, the storage cells are "stacked" upon one another above the substrate but are separately addressable (e.g., by way of a "crosspoint" access architecture where a first set of access lines run orthogonal to a second set of access lines and a particular, accessed cell resides at the intersection of a pair of activated access lines). A higher resistive cell state corresponds to one logical state and a lower resistive cell state corresponds to a second logical state.

An example of an emerging NVRAM technology is Optane™ or 3D XPoint™ memory from Intel Corporation. More generally, emerging NVRAM technologies may be composed of a phase change based memory, a three dimensional crosspoint memory, "write-in-place" non volatile main memory devices, memory devices having storage cells composed of chalcogenide, multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Any of these technologies may be byte addressable so as to be implemented as system/main memory in a computing system rather than traditional block or sector based non volatile mass storage. Because these technologies can be accessed at fine granularities they can also behave as mass storage devices (their native accessing granularity is less than what the host system may access them according to).

Emerging NVRAM memory technologies typically have some combination of the following: 1) higher storage densities than DRAM (e.g., by being constructed in three-dimensional (3D) circuit structures (e.g., a crosspoint 3D circuit structure)); 2) lower static data retention power consumption densities than DRAM (e.g., because they do not need refreshing); and/or, 3) access latency that is slower than DRAM yet still faster than traditional non-volatile memory technologies such as flash. The latter characteristic in particular permits various emerging non volatile memory technologies to be used in a main system memory role rather than a traditional mass storage role (which is the traditional architectural location of non volatile storage).

In various embodiments far memory 310 can act as a true system memory in that it supports finer grained data accesses (e.g., cache lines, byte addressability) rather than only larger based "block" or "sector" accesses associated with traditional, non volatile mass storage (e.g., solid state drive (SSD), hard disk drive (HDD)), and/or, otherwise acts as a byte addressable memory that the program code being executed by processor(s) of the CPU operate out of.

In various embodiments, the multi-level memory 212 may be implemented with dual in-line memory modules (DIMMs) where a single DIMM has both volatile (e.g., DRAM) and (e.g., emerging) non volatile memory semiconductor chips disposed on it. In other configurations DIMMs having only DRAM chips may be plugged into a same system memory channel (e.g., a double data rate (DDR) channel) with DIMMs having only non volatile system memory chips. In still yet other or combined embodiments, stacked memory modules may be used instead of or in combination with DIMMs.

In another possible configuration, a memory device such as a DRAM device functioning as near memory 204 may be assembled together with the memory controller 216 and processing cores onto a single semiconductor device (e.g., as embedded DRAM) or within a same semiconductor chip or multi-chip package (e.g., stacked on or next to a system-on-chip that contains, e.g., the CPU, memory controller, peripheral control hub, etc.).

Far memory 210 may be formed by other devices, such as slower non-volatile memory and may be attached to, or integrated in the same package as well. Alternatively, far memory 210 may be external to a package that contains the CPU cores and near memory devices. A far memory controller may also exist between the main memory controller and far memory devices. The far memory controller may be integrated within a same semiconductor chip package as CPU cores and a main memory controller, or, may be located outside such a package (e.g., by being integrated on a DIMM or stacked memory module having far memory devices).

In various embodiments, some or all of near memory 304 has its own system address space. In this case, the portion of near memory 304 that has been allocated its own system memory address space acts, e.g., as a higher priority level of system memory. In further embodiments, some other portion of near memory 304 may also act as a memory side cache (that caches the most frequently accessed items from main memory (which may service more than just the CPU core(s) such as a GPU, peripheral, network interface, etc.) or last level CPU cache (which only services CPU core(s)).

3.0 IMPROVED PAGE FAULT HANDLING TECHNIQUE

Figure 3:
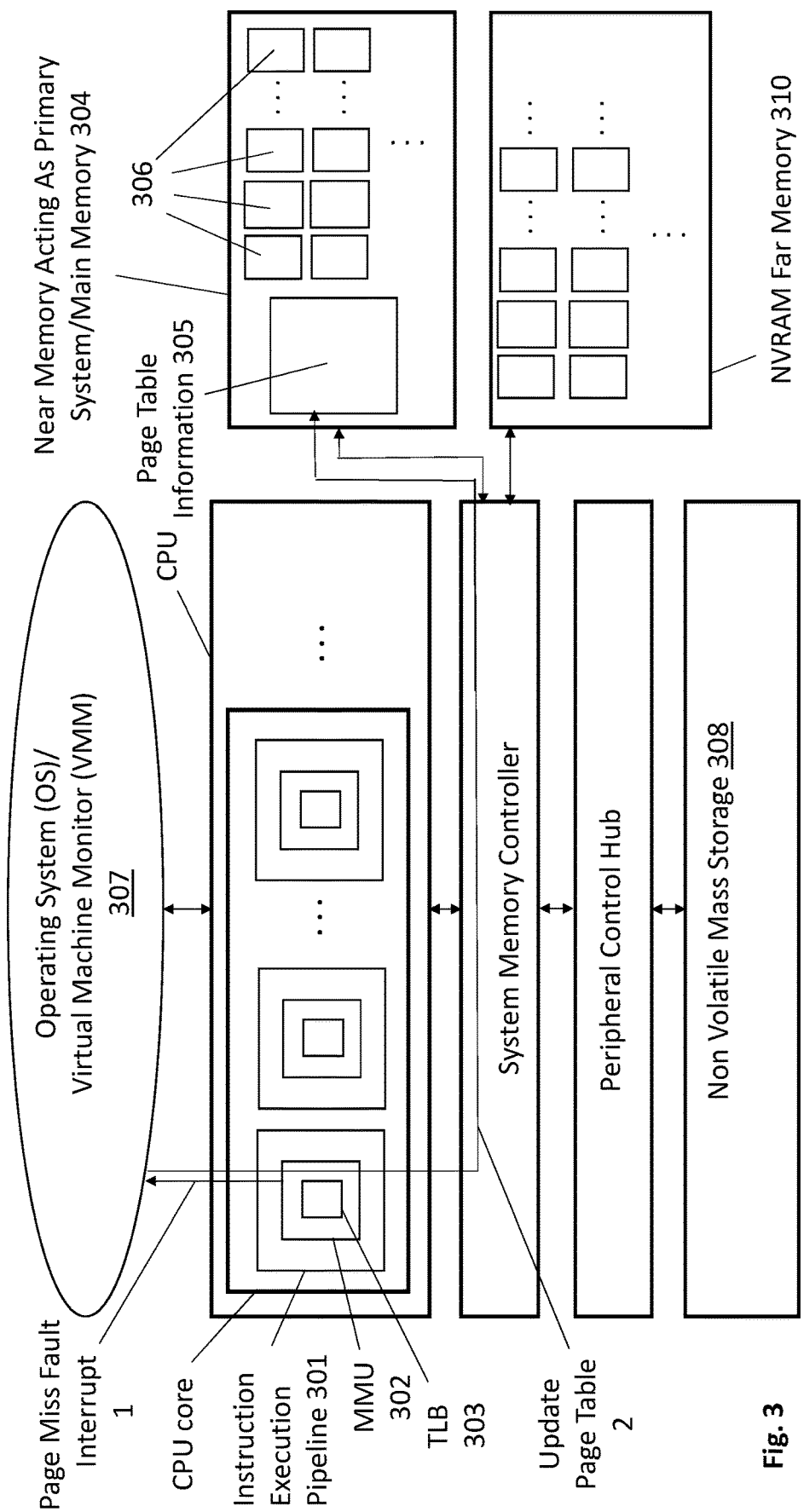
FIG. 3 shows an improved page fault handling process.

A multi-tiered memory having NVRAM as described above provides for the possibility of unique memory accessing paradigms from a software perspective. In particular, NVRAM could conceivably be used as mass storage (e.g., "disk cache" or faster, upper layer of mass storage) or system memory. FIG. 3 shows an improved page fault handling technique that includes an NVRAM layer 310 behaving as either main memory or mass storage at page level granularity.

Here, a faster, upper layer of DRAM near memory is deemed to be primary main memory 304. The lower, NVRAM far memory layer 310 is initially viewed as mass storage but is able to switch to main memory status/usage at page level granularity in order to more efficiently handle page faults that arise when executing out of the primary main memory level 304.

Referring to FIG. 3, initially, a memory access instruction is executed that misses in both the TLB 303 and in the page table entries 305 (page fault). In an embodiment, as alluded to above, the upper near memory layer 304 is regarded as primary main memory and the page table information 305 only lists virtual to physical address translations for pages in primary main memory 304. The page fault that occurs with respect to the memory access instruction indicates that the needed page is not in primary main memory 304 and is instead in mass storage.

As such, a page fault interrupt is generated 1 which triggers the OS/VMM 307 into action to handle the page fault. Here, again, the OS/VMM 307 keeps the system configuration information that identifies where each instance of software and its working data space has been installed in mass storage, including far memory NVRAM 310. If the needed page is in NVRAM 310, the OS/VMM 307 then expands 2 the page table entry information 305 to include an additional virtual to physical address translation having the upper bits of the instruction's virtual address as the virtual component and the physical address of the page in NVRAM 310 as the physical component. In an embodiment, the page table expansion 2 is physically implemented by execution of one or more instructions by the OS/VMM 307 (e.g., microcoded or otherwise) that is/are designed to physically expand the page table information 305.

Thus, the page table information 305 expands to include not only virtual to physical address translations that point to physical memory locations in primary DRAM main memory 304 (near memory), but also NVRAM 310 (far memory). As such, the size of system memory expands from the perspective of the OS/VMM As described in the preceding section, NVRAM far memory 310 can readily conform to have main memory characteristics. For example, among other possible implementations discussed in the preceding section, the NVRAM die may be disposed on DIMMS that are coupled to a memory channel that emanate from a system memory controller. As such, the physical addresses of NVRAM memory capacity are easily converted to main memory space (e.g., with a memory channel definition/identification and address associated with the memory channel). In an embodiment, NVRAM far memory 310 is accessed in direct access (DAX) mode by the OS/VMM 307 to enable the easy conversion of an NVRAM page to system memory status.

With the needed page in NVRAM 310 now being affirmatively pointed to by a newly entered translation entry in the page table information 305, the page can be viewed as an element of both primary main memory and mass storage. In an embodiment, the TLB 303 is also updated to include the new translation (such that the TLB 303 also contains a mixture of entries that point to different regions 304, 310 of memory). The memory access instruction is re-executed, a TLB or page table hit results, and the instruction is serviced directly from NVRAM 310 as per standard main memory operation.

As such, the page fault 1 is fully serviced without the associated, time consuming inefficiency of any of: 1) propagation of an I/O read request through system traffic to a peripheral control hub; 2) accessing a slower, traditional mass storage device; and, 3) transferring of page(s) of information from the traditional mass storage device through the system to main memory. Rather, the data is accessible directly from the main memory control plane (a system memory controller) without any movement of the page's data from its original location when the page fault occurred.

Thus, the size of system memory from the OS/VMM perspective becomes commensurate with the number of translations that the page tables 315 are able to hold (e.g., effective system memory size=(maximum number of translations that can be entered in the page tables)×(page file size)). If the page tables 315 are able to hold enough translations for the entire page capacity of both near memory 304 and NVRAM far memory 310, then, the size of system memory from the perspective of OS/VMM 307 can be as large as the total capacity of both near memory 304 and NVRAM far memory 310.

By contrast, if the page tables 315 are not large enough to hold that many translations, then at least some percentage of the NVRAM's total capacity cannot be given main memory status. However, NVRAM pages can easily swap status between main memory and mass storage status. For example, a first NVRAM page having main memory status and corresponding translation in the page tables 315 can be swapped out of main memory status simply by replacing its translation in the page tables 315 with the translation for another NVRAM page that is moved up from mass storage status to main memory status.

Conceivably, over the course of system runtime, more frequently used pages in NVRAM 310 having system memory status can have their translations modified so that the physical address component of their respective translations corresponds to a location in near memory DRAM 304 rather than a location in far memory NVRAM 310 (e.g., to move the more frequently used pages up to the faster near memory layer of system memory). If near memory DRAM is full, the swapping of a system memory page from NVRAM 310 to near memory DRAM 304 must be preceded by the swapping out of a page in near memory DRAM 304 beforehand.

The page may be swapped to NVRAM 310 (assuming space exists) and retain its main memory status (by keeping a translation for it in the page tables 315 but with new physical address that points to NVRAM). Contrawise, the page may be swapped to mass storage. In this case the page (assuming it is dirty) is written back to NVRAM if NVRAM is acting as a disk cache, or, if NVRAM is acting as a faster layer of mass storage and the page's non volatile copy is kept in NVRAM. Alternatively the page can be written back to the backing store 308 if its non volatile copy is kept there instead.

Figure 4:
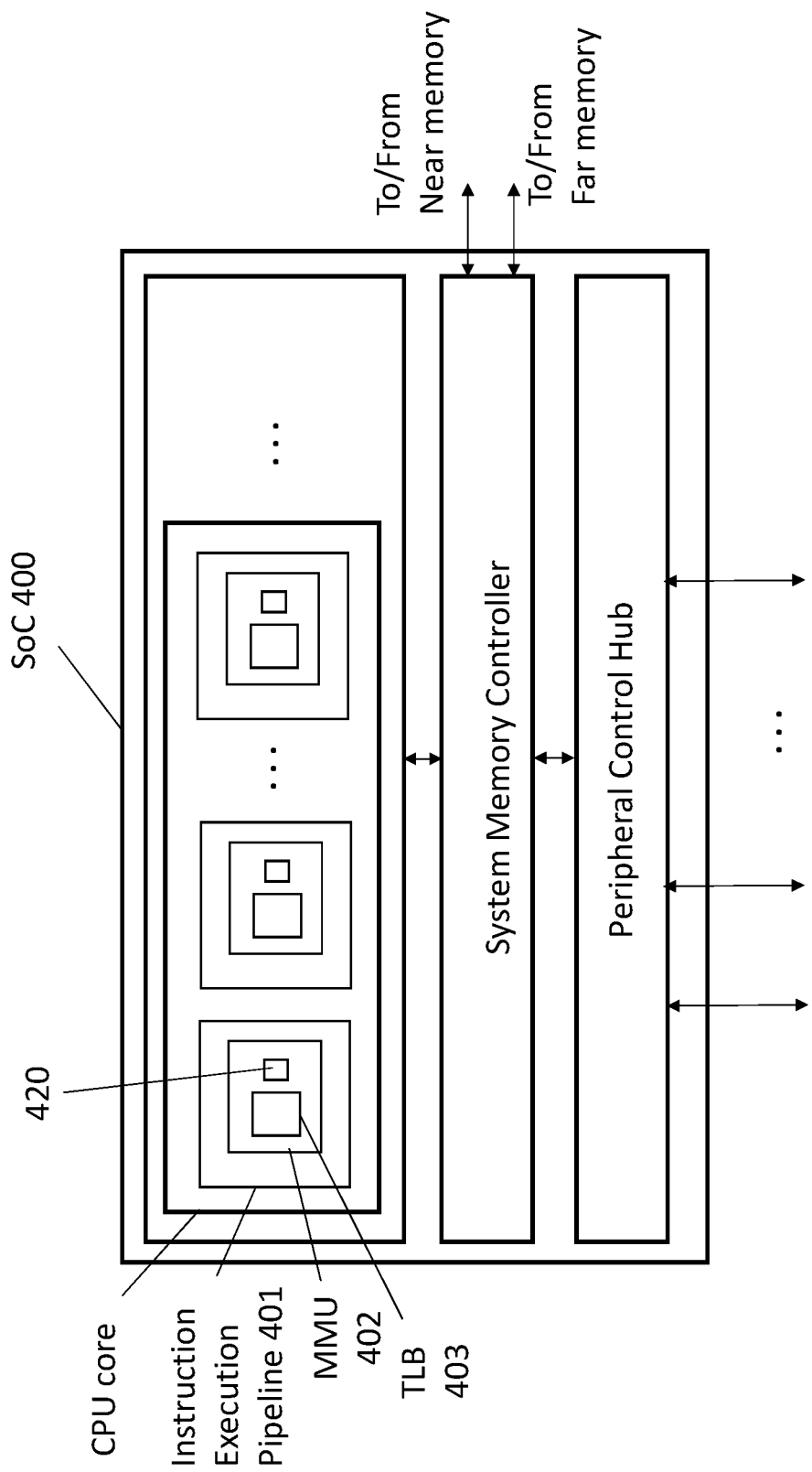
FIG. 4 shows a semiconductor chip that can implement the improved page fault handling process of FIG. 3.

FIG. 4 shows a system-on-chip (SoC) 400 having integrated CPU with multiple processing cores, system memory controller and peripheral control hub. As observed in FIG. 4, the system memory controller is able to read/write from/to near memory and far memory NVRAM layers. The SoC also includes logic circuitry 420 (e.g., in the instruction execution pipeline 401, such as within or associated with the MMU 402) to receive a new address translation (or at least the physical address component of one) from OS/VMM whose physical address component points to NVRAM and write the new address translation in the TLB 403 and/or the page table entries of the system so that the corresponding NVRAM page/address becomes recognized as a system memory page/address.

Although the above embodiments stressed the existence of a multi-level memory or the existence of a DRAM near memory layer, notably, the above described fast page fault handling technique does not actually require either. That is, for example, all of system memory could be implemented in NVRAM (near memory does not exist) and the size of near memory in NVRAM expands at the expense of mass storage space in NVRAM using the page fault handling technique described herein.

Although embodiments above have stressed the use of emerging non volatile memories as NVRAM, conceivably other non volatile memories, such as NAND (e.g., z-NAND from Samsung), could be used—to the extent such NAND memories are capable of operating in a system memory capacity and therefore can be characterized as NVRAM. NAND memory is also known to include three dimensionally stacked storage cells above the semiconductor chip substrate.

Although embodiments above have stressed that an OS/VMM responds to a page fault and expands a page table in response, conceivably other forms of program code may perform this operation such as firmware.

4.0 ADDITIONAL COMMENTS

Figure 5:
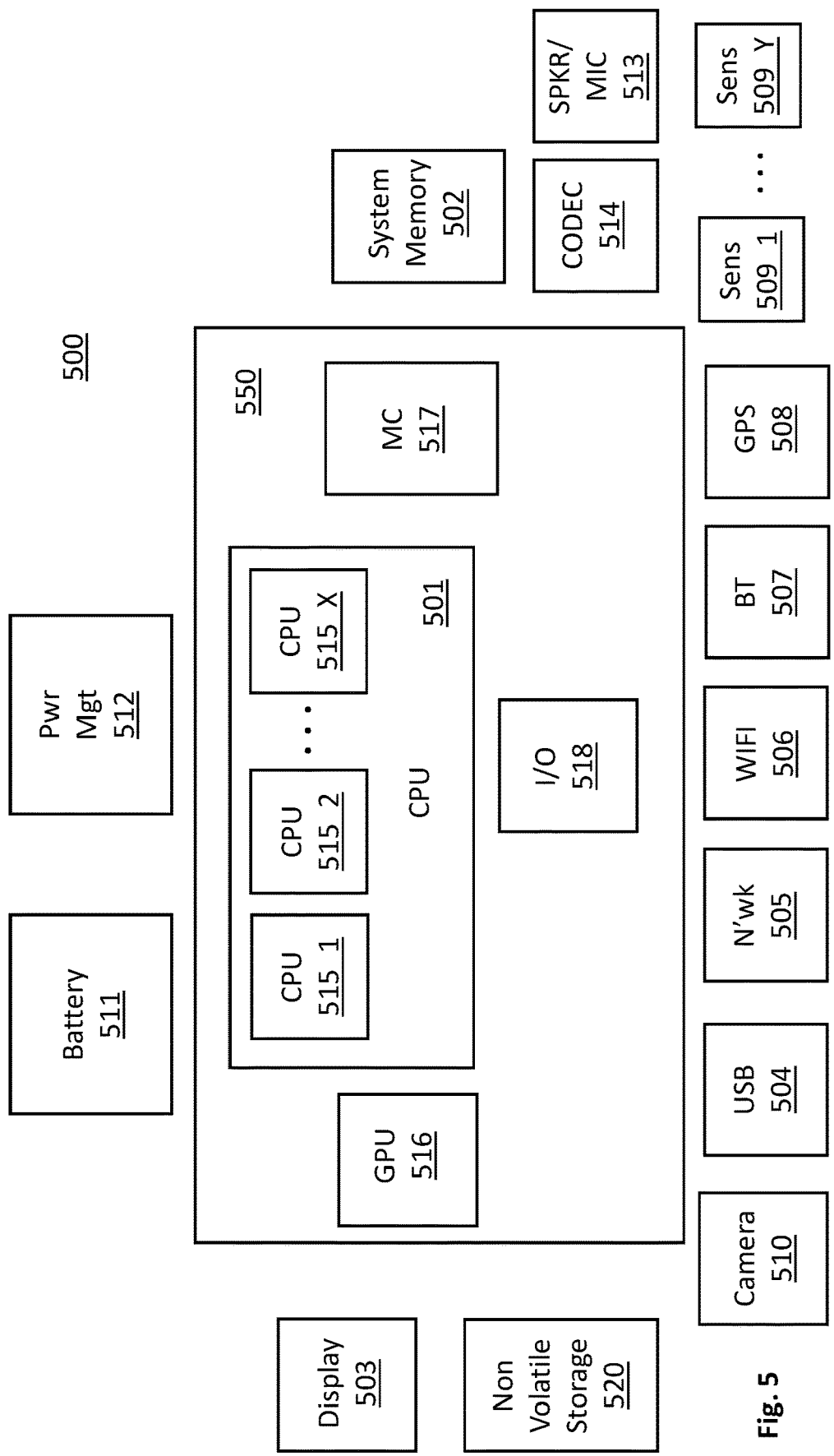
FIG. 5 shows a computing system.

FIG. 5 provides an exemplary depiction of a computing system 500 (e.g., a smartphone, a tablet computer, a laptop computer, a desktop computer, a server computer, etc.). As observed in FIG. 5, the basic computing system 500 may include a central processing unit 501 (which may include, e.g., a plurality of general purpose processing cores 515_1 through 515_X) and a main memory controller 517 disposed on a multi-core processor or applications processor, system memory 502, a display 503 (e.g., touchscreen, flat-panel), a local wired point-to-point link (e.g., USB) interface 504, various network I/O functions 505 (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_Y, one or more cameras 510, a battery 511, a power management control unit 512, a speaker and microphone 513 and an audio coder/decoder 514. The CPU 501 or other processor (e.g., GPU) or other high-performance semiconductor chip may include a heat sink assembly having a pre-loaded bolt as described herein and/or a carrier with anti-tile posts as described herein.

An applications processor or multi-core processor 550 can be an SOC that includes one or more general purpose processing cores 515 within its CPU 501, one or more graphical processing units 516, a memory management function 517 (e.g., a memory controller) and an I/O control function or peripheral controller 518. The general-purpose processing cores 515 typically execute the operating system and application software of the computing system. The graphics processing unit 516 typically executes graphics intensive functions to, e.g., generate graphics information that is presented on the display 503. The memory control function 517 interfaces with the system memory 502 to write/read data to/from system memory 502.

Each of the touchscreen display 503, the communication interfaces 504-507, the GPS interface 508, the sensors 509, the camera(s) 510, and the speaker/microphone codec 513, 514 all can be viewed as various forms of I/O (input and/or output) relative to the overall computing system including, where appropriate, an integrated peripheral device as well (e.g., the one or more cameras 510). Depending on implementation, various ones of these I/O components may be integrated on the applications processor/multi-core processor 550 or may be located off the die or outside the package of the applications processor/multi-core processor 550.

The computing system also includes non-volatile storage 520 which may be the mass storage component of the system. The memory controller 517 may be designed to interface with two different levels of memory, e.g., DRAM and NVRAM. A lower non volatile level of the memory can swap its status between formal main memory and mass storage at page level granularity as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components. For example, a machine-readable storage medium may be used to store drawings of components described herein, and/or, of automated socket assembly/manufacturing processes described herein.

Therefore, elements of the present invention may also be provided as a machine-readable medium for storing the machine-executable instructions (e.g., object code, microcode, etc.). The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A non-transitory machine readable storage medium containing program code that when processed by a computing system causes the computing system to perform a method, comprising:
   receiving notice of a page fault, a page targeted by a memory access instruction that resulted in the page fault residing in a persistent memory without system memory status; and,
   in response to the page fault, updating page table information to include a translation that points to the page in the persistent memory such that the page changes to system memory status without moving the page and system memory expands to include the page in the persistent memory.

2. The non-transitory machine readable storage medium of claim 1 wherein the system memory also includes dynamic random access memory (DRAM).

3. The non-transitory machine readable storage medium of claim 1 wherein the method is performed by any of:
   a virtual machine monitor;
   an operating system;
   firmware.

4. The non-transitory machine readable storage medium of claim 1 wherein the method if performed by execution of an instruction to update the page table information.

5. The non-transitory machine readable storage medium of claim 1 wherein the updating of the page table is carried out in hardware by a memory management unit of an instruction execution pipeline.

6. The non-transitory machine readable storage medium of claim 1 wherein the page table information is kept in the system memory.

7. The non-transitory machine readable storage medium of claim 1 wherein the persistent memory is composed of three-dimensionally stacked resistive memory cells.

8. A computing system, comprising:
   a plurality of processing cores;
   a system memory;
   a memory controller coupled between the system memory and the plurality of processing cores;
   a network interface;
   a mass storage device, the mass storage device containing program code that when processed by the computing system causes the computing system to perform a method, comprising:
     receiving notice of a page fault, a page targeted by a memory access instruction that resulted in the page fault residing in a persistent memory without system memory status; and,
     in response to the page fault, updating page table information to include a translation that points to the page in the persistent memory such that the page changes to system memory status without moving the page and a system memory expands to include the page in the persistent memory.

9. The computing system of claim 8 wherein the system memory also includes dynamic random access memory (DRAM).

10. The computing system of claim 8 wherein the method is performed by any of:
    a virtual machine monitor;
    an operating system;
    firmware.

11. The computing system of claim 8 wherein the method is performed by execution of an instruction to update the page table information.

12. The computing system of claim 8 wherein the updating of the page table is carried out in hardware by a memory management unit of an instruction execution pipeline.

13. The computing system of claim 8 wherein the page table information is kept in the system memory.

14. The computing system of claim 8 wherein the persistent memory is composed of three-dimensionally stacked resistive memory cells.

15. An apparatus, comprising:
    a semiconductor chip comprising a processing core having an instruction execution pipeline, the instruction execution pipeline comprising a memory management unit, the semiconductor chip comprising a memory controller to interface with a persistent memory, the memory management unit to update page table information in response to a page fault to include a translation that points to a page in the persistent memory such that the page changes to system memory status without moving the page and a system memory expands to include the page in the persistent memory, the page targeted by a memory access instruction that resulted in the page fault.

16. The apparatus of claim 15 wherein the memory controller is to interface with the system memory, the system memory also comprising dynamic random access memory (DRAM).

17. The apparatus of claim 15 wherein the update is responsive to a command from executing program code, the command responsive to the page fault.

18. The apparatus of claim 15 wherein the memory management unit is to update a translation lookaside buffer of the memory management unit with the translation.

19. The apparatus of claim 18 wherein the memory management unit generates the page fault.

20. The apparatus of claim 15 wherein the page table information is to be kept in the system memory.

* * * * *